(12) United States Patent
Joshi

(10) Patent No.: US 8,339,755 B2
(45) Date of Patent: Dec. 25, 2012

(54) ELECTRICAL FAULT RESTRICTING SYSTEM

(76) Inventor: Mukundlal Joshi, Ahmedabad (IN)

( * ) Notice: Subject to any disclaimer, the term of this patent is extended or adjusted under 35 U.S.C. 154(b) by 237 days.

(21) Appl. No.: 12/442,667

(22) PCT Filed: Dec. 4, 2006

(86) PCT No.: PCT/IN2006/000484
§ 371 (c)(1),
(2), (4) Date: Mar. 24, 2009

(87) PCT Pub. No.: WO2008/023385
PCT Pub. Date: Feb. 28, 2008

(65) Prior Publication Data
US 2010/0039742 A1    Feb. 18, 2010

(30) Foreign Application Priority Data
Aug. 25, 2006   (IN) .................. 1482/MUM/2005

(51) Int. Cl.
*H02H 3/00* (2006.01)

(52) U.S. Cl. ........................................ 361/42; 361/62
(58) Field of Classification Search .............. 361/62, 361/66, 65, 68, 79, 59, 42, 44, 67
See application file for complete search history.

(56) References Cited

U.S. PATENT DOCUMENTS

| | | | | |
|---|---|---|---|---|
| 5,335,135 | A * | 8/1994 | Kinney ........................... | 361/79 |
| 7,453,677 | B2 * | 11/2008 | Bucella et al. .................. | 361/62 |
| 7,783,437 | B2 * | 8/2010 | Oguchi et al. .................. | 702/59 |
| 2007/0008670 | A1 * | 1/2007 | Fletcher et al. ................. | 361/62 |
| 2007/0109701 | A1 * | 5/2007 | Fickey ............................ | 361/62 |
| 2007/0201170 | A1 * | 8/2007 | Hooper ........................... | 361/42 |
| 2008/0106838 | A1 * | 5/2008 | Sirivella et al. ................ | 361/62 |

* cited by examiner

Primary Examiner — Danny Nguyen
(74) Attorney, Agent, or Firm — Reising Ethington P.C.

(57) ABSTRACT

Electrical fault restricting system for an electrical equipment and/or electrical system has a monitoring unit placed at location of interest to sense or measure electrical fault occurred with the help of sensing or measuring device which is further connected to signal processing and controlling unit which receives data collected by the monitoring unit that provides output for fault identification, alarming and controlling actions to alarming. An indication unit and command for trip signal to circuit breaking device where processed data of data collecting and processing unit are stored at data history storage. A display unit for back reference monitoring unit provides images to image receiver. A processor and controlling unit further provides processed images to an additional data history storage and display unit for future analysis of conditions where plurality of signal processing and controlling unit is inter connected with additional remote central controlling and data handling unit.

9 Claims, 4 Drawing Sheets

A = Electrical System or Electrical Equipment.
N = Sensing or Measuring Device.
M = Monitoring Unit.
S = Signal Processing and Controlling Unit.
P = Image receiver, Processor and Controlling Unit.
H = Data History Storage and Display Unit.
I = Alarming & Indication Unit.
R = Remote Central Controlling and Data Handling Unit.
E = Circuit Breaking Device.

ELECTRICAL FAULT RESTRICTING SYSTEM

BACKGROUND OF THE INVENTION

The present invention is related to the electrical fault restriction system to be used in electrical system and/or electrical equipment. The present invention is particularly related to the electrical fault restriction system by which electrical fault can be restricted from preliminary stage.

It is necessary that any electrical system and/or electrical equipment must be protected from severe effects of electrical faults. There are various types of faults affecting the system like short circuit fault, over current fault, open circuit fault, thermal hot spot and earth fault. In any electrical equipment/system hot spot develops due to loose connections or overloading and sparks, arcs develops due to insulation failure say earth fault or phase to phase fault/short circuits, and due to open circuits.

PRIOR ART

There are systems available for fault restriction that work for all type of voltage class where they identify electrical fault with the help of measuring devices. These measuring devices measure electrical parameters of electrical system and/or equipment. In normal conditions, measured value of parameters indicate voltage and current of electrical system and/or equipment. Now at fault condition, measured value of parameters indicate voltage and current of system or equipment with fault. So it is very difficult to identify actual electrical parameters particularly current due to fault. Comparing the measured value with the set value of measured parameters, controlling device gives trip signal to save electrical system and/or equipment. To avoid mal operation of electrical system and/or equipment, the set values of electrical parameters are kept at some higher level than what is required. Hence, fault is not restricted at its initial stage of development but at set value of electrical parameters of electrical system and/or equipment in present fault restricting system. It is clear when level of fault reaches at higher stage, it may damage severely to electrical system and/or equipment.

Moreover, the present systems are on bases of assumptions for some type of fault hence they do not provide accurate results. These systems are less sensitive for fault.

With the available systems for electrical fault protection, they are able to protect only when level of the electrical parameters in electrical system and/or electrical equipment reaches at set values of the electrical parameters. The faulty section is isolated from entire system thus entire system is saved. But the fault cannot be noticed by alarming at preliminary stage and also the location at which the fault has occurred cannot be identified. Moreover, when the fault reaches at severe stage, the faulty area can be badly affected which may result into total shut down of electrical system and/or electrical equipment.

The existing systems are not able to provide any records of abnormality for further analysis, which is essential for preventive maintenance, work in electrical system and/or electrical equipment.

In existing systems, abnormality in electrical system and/or electrical equipment is not identified at its preliminary stage of fault, that fault event may not be minimized near to zero level.

The existing systems do not give any indication of the sensed signal in developing stage of fault and there by they are unable to prevent the further development of fault in electrical system and/or electrical equipment and may also damage to the electrical system and/or electrical equipment.

The existing systems are not able to identify the location of fault. Hence it takes more time to restore the affected electrical system and/or equipment.

OBJECTS OF THE INVENTION

So with the goal of providing the system to find the electrical fault in preliminary stage of fault, identify the location of fault and restrict the electrical fault at its origin and thereby to protect the entire electrical system and/or electrical equipment in connection with the location of interest of electrical fault in electrical system and/or electrical equipment, the inventor has proposed the electric fault restricting system.

The main object of the invention is to protect electrical system and/or electrical equipment from severe damages by continuous monitoring of electrical fault conditions, identifying faults at preliminary stage and alarming and tripping electrical system and/or electrical equipment at preliminary stage of fault efficiently.

The further object of the invention is to include facility of data history storage which provides stored data for further analysis of fault condition in electrical system and/or electrical equipment and which is essential for planning of preventive maintenance work.

The further object of the invention is to reduce damages to electrical system and/or electrical equipment occurring due to electrical fault and so the surrounding electrical system and/or equipment(s) are also saved from effect of fault, which reduces damage cost and save considerable restoration time.

The further object of the invention is to identify fault location and its condition easily and quickly and have the invention suitable for use with electronic circuits including a microprocessor.

The further object of the invention is that every sensed/measured fault abnormality is noticed, analyzed, recorded as data history, accessed for performance of electrical system and/or electrical equipment, and the electrical system and/or electrical equipment is prevented from severe effects by tripping at preliminary stage of fault.

The further object of the invention is to provide plurality of monitoring unit in the system to sense/measure the fault signal at preliminary stage of fault and gives location of fault and there by each unit monitors abnormality and transmits fault signal with reference to related location for further actions.

DETAILED DESCRIPTION OF INVENTION

The proposed invention is now described in detail with the help of drawings as under:

DETAILED DESCRIPTION OF SPECIFIC EMBODIMENTS

Figure 1:
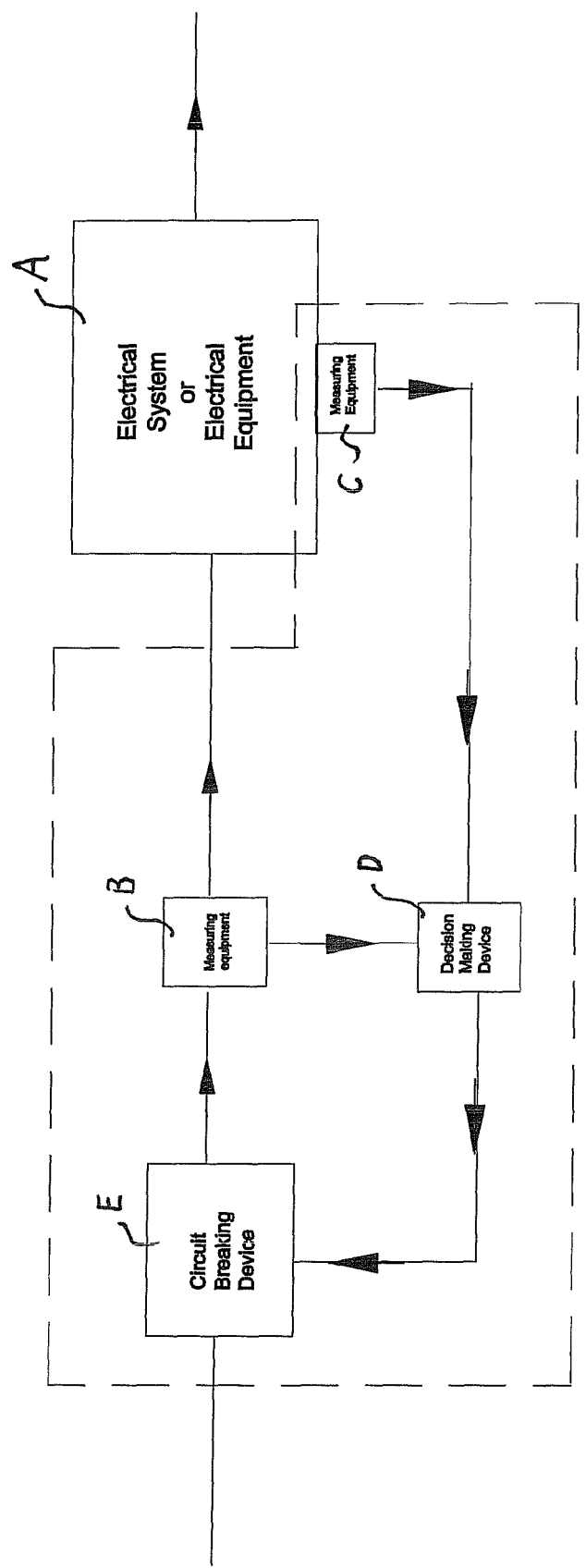
FIG. 1 shows diagrammatical arrangement of existing electrical fault restricting system.

FIG. 1 shows diagrammatical arrangement of prior art working. An electrical system and/or equipment A is protected with the help of measuring equipment B and measuring equipment C where measuring equipment B measures electrical parameters such as current, voltage and frequency and measuring equipment C measures local internal parameters such as temperature, pressure etc. Measuring device B and C measure required parameters and send data continuously to decision making device D. This decision making device D comprises of Relay, O/L thermal switch etc. Decision making device D continuously monitors these parameters. When any of the parameters is/are found above predetermined values, decision making device D gives trip signal to electrical circuit breaking device E. Thus the trip signal is sent to the electrical system and/or equipment and electrical system and/or equipment is protected but the location of fault cannot be identified in the existing systems.

Figure 2:
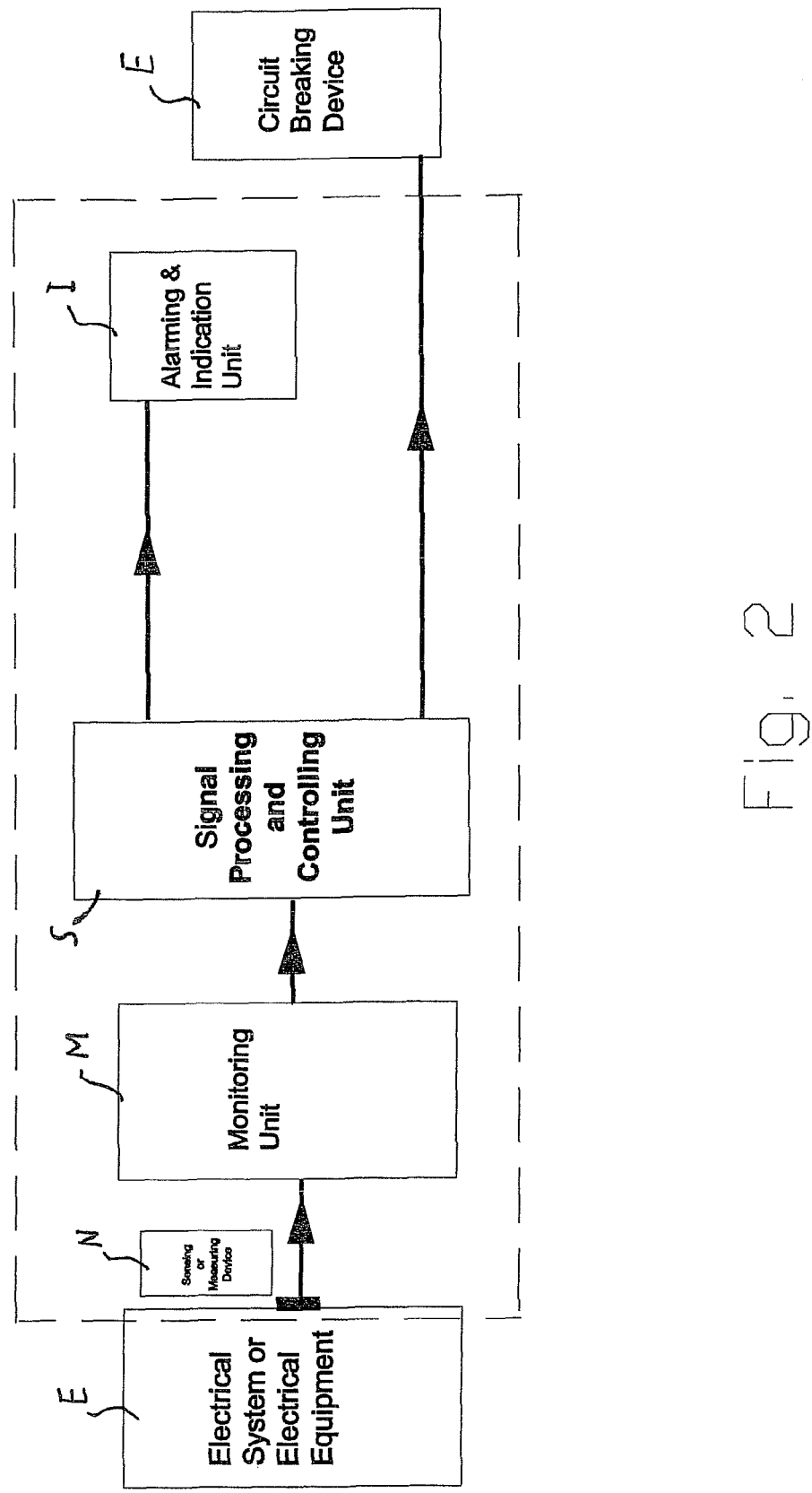
FIG. 2 shows block diagram of electrical fault restricting system with required facility of alarming and tripping command, indicating and display of required data.

FIG. 2 shows block diagram of proposed electrical fault restriction system. This fault restricting system can be divided in three different sections:
i. Monitoring unit M
ii. Signal processing and controlling unit S
iii. Alarm and indication unit I The monitoring unit M senses or measures electrical fault conditions in electrical system and/or equipment with the help of a sensing or measuring device N. A sensed or measured signal by sensing or measuring device N is directly proportional to electrical fault conditions at a point of electrical fault. A signal sensed by the sensing device is directly proportional to hot spots and arc developed at a location of interest due to electrical fault like short circuit, open circuit, thermal hot spot and earth faults. The sensors are sensing the effects of hot spots, arcs and sparks generated at the location where it is placed in the electrical equipment. As in any motor the sensor placed inside the cable terminal box senses the signals generated by any electrical fault like a hot spot due to loose connections or overloading and sparks, arcs due to insulation failure say earth fault or phase to phase fault/short circuits, and due to open circuits. Thus the sensing device collects fault condition signals from a very initial stage and sends them to the monitoring unit. The sensing device collects light and heat signals from a very initial development of hot spots, sparks and arcs, and same are helpful to identify and trap the fault condition before it may increase and create further damages. The initial developing stage arcs and sparks have low fault currents compared to the heavy fault currents which are measured in conventional protection schemes. The measuring device measures earth fault component of earth fault current at the point of fault. The measuring device is connected in the earthing path of the electrical equipment, it measures purely earth fault current and same is sent to the monitoring unit. The direct current measurement of earth or ground fault provides very early indications of fault from initial stage of fault development. The individual monitoring unit 'M' is connected with an individual sensing or measuring device. Thus each sensing and measuring device connects with individual monitoring unit which separately collects the signals which are amplified and sent to the signal processing and controlling unit 'S'. The signal processing and controlling unit collects data of sensed or measured signal from individual monitoring units. The individual monitoring unit is identified with unique identity say channel number 1, 2, 3 . . . , n, and same signals are received with reference of such identification channel number. The identity of such monitoring unit channel number is referred with location where the sensing or measuring device is placed. So, the signals from the individual monitoring unit is processed at signal processing and controlling unit with reference to the particular location as mentioned with channel number identity. In the same way the output signals from signal processing and controlling unit are with reference of such particular location (i.e. identified channel number). So, fault occurrence data and actions performed by the signal processing and controlling unit is performed with identification of specific location. The signal processing and controlling unit processes collected data signals from monitoring units for determining the amplitude, duration and quantity of electrical fault events. The signal processing and controlling unit performs actions like alarming, indications and tripping commands to restrict such fault. The signal processing and controlling unit provides the data with reference to a particular fault signal received from individual monitoring unit. As the hot spots and arcs sensed by sensing devices and earth fault current component from the measuring device from very initial fault development stage, the same data are processed and provided for further actions by signal processing and controlling unit which provides actions to restrict the fault (instead of actions are initiated after larger fault currents reflected in measured line currents in conventional schemes).

Figure 3:
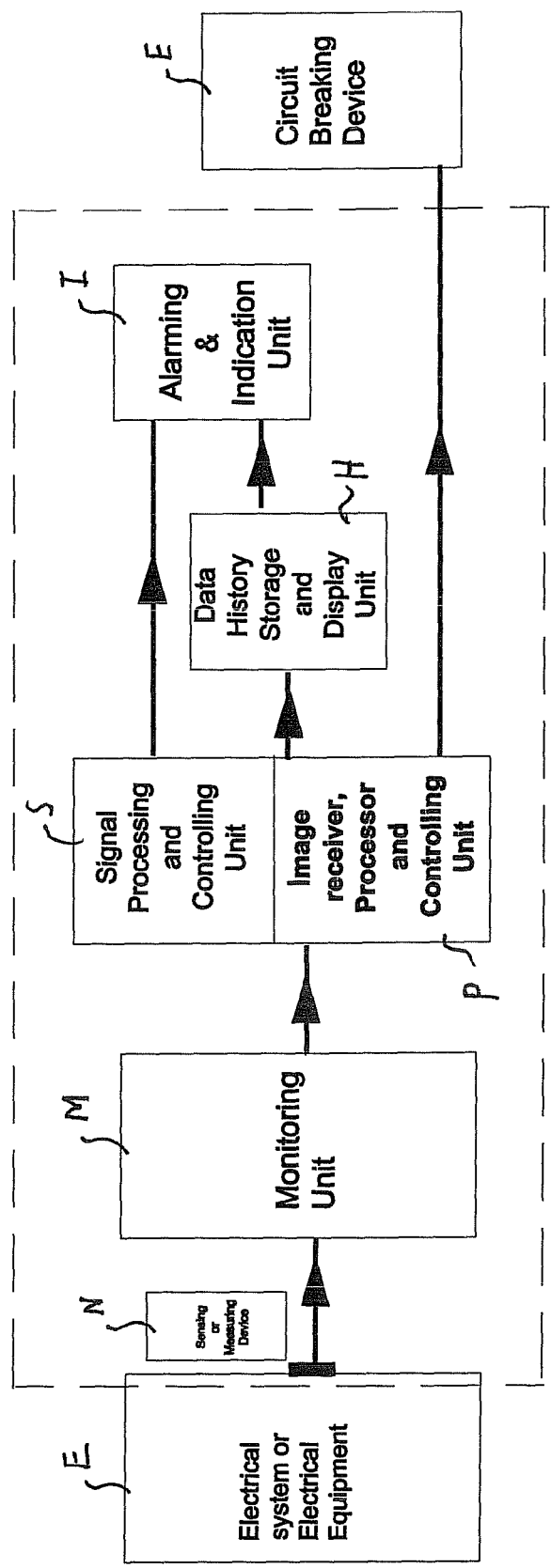
FIG. 3 shows block diagram of electrical fault restricting system with required facility of alarming and tripping command, indicating and display of required data, data history storage and display of condition at a location of fault at time of fault.

FIG. 3 shows block diagram of Electrical fault restriction system. In a fault restricting system can be now divided in four different sections with an additional facility of Data history storage and display unit to the previous embodiment:
i. Monitoring unit M
ii. Signal processing and controlling unit S and Image receiver, processor and controlling unit P
iii. Alarm and indication unit I
iv. Data history storage and display unit H The monitoring unit M senses or measures electrical fault conditions in the electrical system and/or equipment with the help of the sensing or measuring device N. The sensed or measured signal by sensing or measuring device N is directly proportional to electrical fault conditions at point of electrical fault. The signal sensed by the sensing device is directly proportional to hot spots and arc developed at location of interest due to electrical fault like short circuit, open circuit, thermal hot spot and earth faults. The measuring device measures earth fault current at the location of interest in electrical system and or electrical equipment. This sensing or measuring device is capable for withstanding in an applied system, nullifying electromagnetic and electrostatic charges, mechanically durable, flexible in size and feasible to place and mount any where even inside the electrical equipment with appropriate mounting as per requirement in the electrical equipment and/or system. The sensed or measured signal is collected at monitoring unit M through necessary arrangement. The monitoring unit M has capability and sensitivity to collect the signals generated from conducting parts under electrical fault condition in an initial stage of the electrical fault. With the help of electronic amplifying and other related circuits, the monitoring unit M is capable for transmitting signals collected at the location of interest that reaches up to signal processing and controlling unit S. The monitoring unit M senses or measures electrical fault at the point of interest in the electrical system and/or equipment. A plurality of monitoring units M may be used as per requirement in a particular electrical system and/or equipment. A signal sensed or measured by the monitoring unit M is transmitted to the signal processing and controlling unit S through necessary arrangement. An electronic circuit including microprocessor based processing and controlling unit S continuously monitors the sensed or measured signal from the monitoring unit M and processes for fault identification, location identification, fault signal analysis, comparison, indication, alarming and necessary controlling actions executable as electrical fault restriction takes place from an initial stage of electrical fault occurrence at the location of interest. The signal processing and controlling unit S is configured to process collected data signals for determining the amplitude, duration and quantity and indicating same data for notification about particulars of fault signals and gives necessary control command to circuit breaking unit E of electrical system and/or equipment and to alarming and indication unit I that indicates and alarms about fault.

An image receiver, processor and controlling unit P collects images of electrical fault conditions that occurred at a location of interest in electrical equipment and/or an electrical system by arrangement of an image collector with the sensing device. The image receiver, processor and controlling unit 'P' is configured to collect the images of occurrence of electrical fault at the location of interest with the help of the image collector arranged with the sensing device and processes the collected images and creates data of particular electrical fault condition where processed images provide sufficient information which is useful for identification of any electrical fault condition and further necessary conclusion and action related to restriction of electrical fault in the initial stage at the location of interest in electrical equipment and/or electrical system. The image receiver data is stored only as the initiation of a fault condition is detected at any location by the sensing device. The stored images become useful for further analysis for root cause of occurrence and preventive remedies. Internal images are helpful for online assessment of any electrical fault condition. This specialty is important in view of electrical systems condition monitoring and system stability. Processed data of signal processing and controlling unit S and image receiver, processor and controlling unit P are stored at data history storage and display unit H for further analysis of various conditions for development of fault, duration of fault etc. the data history storage and display unit is configured to receive data from the signal processing and controlling unit and provide sufficient data for assessment of fault signal, comparison of fault signal data of the relevant electrical system and/or electrical equipment to conclude information for development of fault condition as signals received from the location of interest. Such concluded information becomes useful for taking decision about planning for preventive maintenance at the location of interest from where signals are received due to electrical fault condition, and concluding about urgency for a task of electrical fault restriction.

Figure 4:
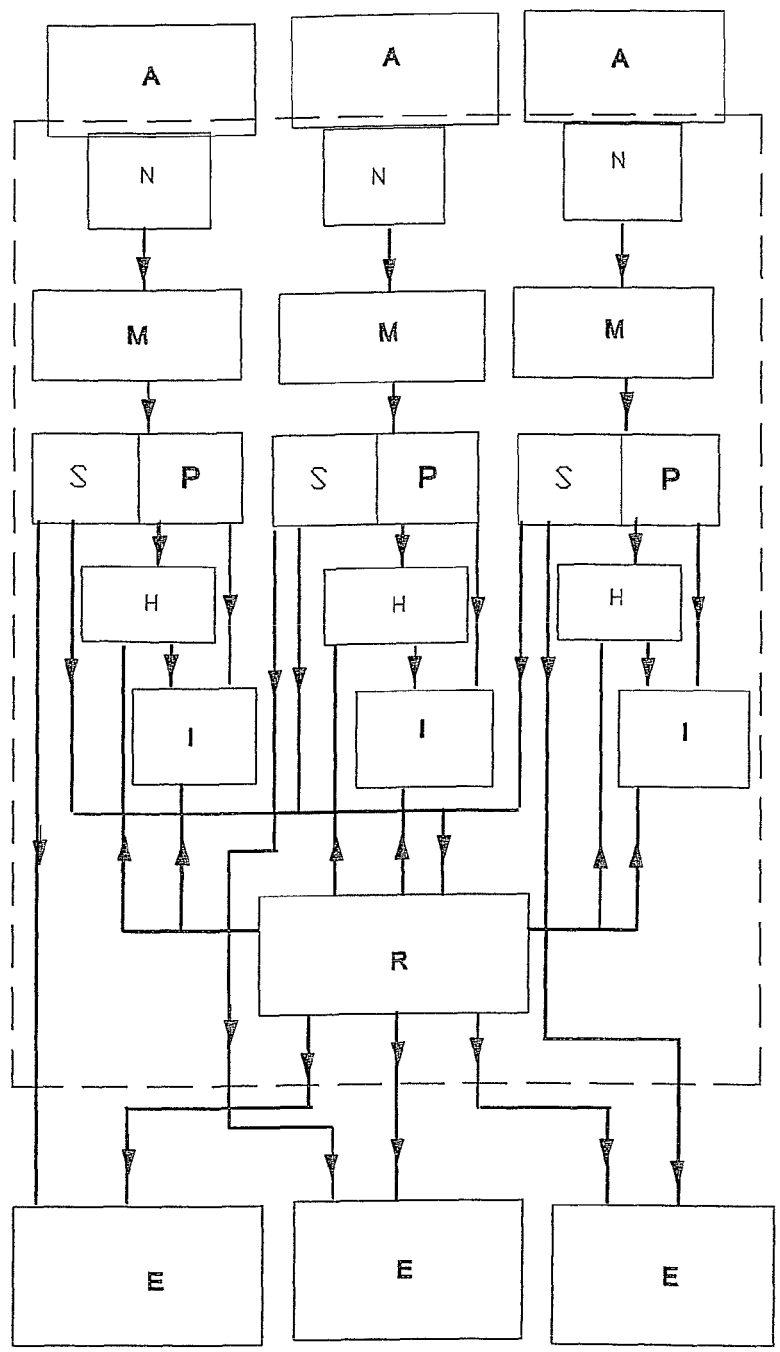
FIG. 4 shows block diagram of electrical fault restricting system working in coordination with central data processing and decision making unit with required facility of alarming and tripping command, indicating, data display, data history storage and display of condition at fault location at time of fault.

FIG. 4 shows block diagram of an electrical fault restriction system with a central remote controlling unit. A fault restricting system can be now divided in five different sections with an additional facility of a remote central control and data handling unit to the previous embodiment:
 i. Monitoring unit M;
 ii Signal processing and controlling unit S, Image receiver, processor and controlling unit P;
 iii. Alarm and indication unit I;
 iv. Data history storage and display unit H; and
 v. Remote central controlling and data handling unit R.

The monitoring unit M senses or measures electrical fault condition in electrical system and/or equipment with the help of sensing or measuring device N. Sensed or measured signal by sensing or measuring device N is directly proportional to electrical fault conditions at point of electrical fault. The signal sensed by sensing device is directly proportional to hot spots and arc developed at location of interest due to electrical fault like short circuit, open circuit, thermal hot spot and earth faults. The measuring device measures earth fault current at the location of interest in an electrical system and or electrical equipment. This sensing or measuring device is capable for withstanding in an applied system, nullifying electromagnetic and electrostatic charges, mechanically durable, flexible in size and feasible to place and mount any where even inside the electrical equipment with appropriate mounting as per requirement in the electrical equipment and/or system. A sensed or measured signal is collected at the monitoring unit M through necessary arrangement. The monitoring unit M has capability and sensitivity to collect the signals generated from conducting parts under electrical fault condition in an initial stage of the electrical fault. With the help of electronic amplifying and other related circuits, the monitoring unit M is capable for transmitting signals collected at the location of interest that reaches up to signal processing and controlling unit S. The monitoring unit M senses or measures electrical fault at the point of interest in the electrical system and/or equipment. A plurality of monitoring units M may be used as per requirement in a particular electrical system and/or equipment.

A signal sensed or measured by the monitoring unit M is transmitted to the signal processing and controlling unit S through necessary arrangement. An electronic circuit including microprocessor based processing and controlling unit S continuously monitors the sensed or measured signal from the monitoring unit M and processes for fault identification, location identification, fault signal analysis, comparison, indication, alarming and necessary controlling actions executable as electrical fault restriction takes place from an initial stage of electrical fault occurrence at the location of interest. The signal processing and controlling unit S is configured to process collected data signals for determining the amplitude, duration and quantity and indicating same data for notification about particulars of fault signals and gives necessary control command to circuit breaking unit E of electrical system and/or equipment and to alarming and indication unit I that indicates and alarms about fault. An image receiver, processor and controlling unit P collects images of electrical fault conditions that occurred at a location of interest in electrical equipment and/or an electrical system from monitoring unit M by arrangement of an image collector with sensing device. After processing the collected images, Image receiver, processor and controlling unit P provides image data to be stored in data history and display unit H and utilizes for necessary alarm and controlling action required to restrict electrical fault in an initial stage at a location of interest in electrical equipment and/or electrical system. The image receiver, processor and controlling unit P provides required image data of fault condition for sufficient time period and before and after fault occurrence on the display unit. Processed data of signal processing and controlling unit S and image receiver, processor and controlling unit P are stored at data history storage and display unit H for further analysis of various conditions for development of fault, duration of fault etc. which is essential for further preventive maintenance work planning for electrical equipment and/or system where the system is applied.

A remote central controlling and data handling unit R is configured to have interconnected with plurality of signal processing and controlling unit S with the help of appropriate interconnecting arrangement. This interconnection provides better, effective and instantaneous electrical fault restriction in wide network. Where in the remote central controlling and data handling unit R is configured to have central data history storage and display unit H for interconnected to plurality of signal processing and controlling units S. In central controlling and data handling unit R, decision of all signal processing and controlling units S are concluded for better and effective operation of electrical equipment and/or electrical system. This system is highly discriminative to avoid unnecessary malfunctions in integrated electrical power system. Data history storage and display unit H in remote central controlling and data handling unit R records required data of all interconnected signal processing and controlling units S and provides necessary alarm and display of data at remote central controlling and data handling unit R and at individual signal processing and controlling units S as per requirement.

The invention claimed is:

1. An electrical fault restricting system for an electrical equipment and/or an electrical system, the electrical fault restricting system comprising:
   a sensing device for sensing fault conditions at a location of a fault and a measuring device measures a signal of earth fault current from the electrical equipment and/or electrical system, the signal sensed by the sensing device or measuring device being directly proportional to electrical fault conditions of a fault path at a point of an electrical fault;
   the sensing device and the measuring device are installed at location of interest and further connected to monitoring units;
   said monitoring units continuously monitor an input fed from the sensing device and the measuring device such that the electrical fault conditions are sensed and measured at the fault location the signal sensed by the sensing device or measuring device are collected at monitoring units and such signals are amplified and further sent to signal processing and controlling unit;
   a signal processing and controlling unit being installed near or remote to the monitoring unit, the signal processing and controlling unit adapted to
      continuously receives the signals sent by monitoring units as generated due to electrical fault conditions in the electrical equipment and/or electrical system, and
      provide an output for fault condition alarms, location identification, fault signal analysis and command for trip signal to a circuit breaking device as electrical fault restriction takes place from initial stage of electrical fault occurrence at the location of interest;
   an alarming and indication unit performs alarms and indications about fault on basis of output provided by the processing and controlling unit;
   an image collector with the sensing device being connected to said signal processing and controlling unit for taking images of the electrical fault conditions at the location of interest as sensed and measured by the sensing device and the measuring device in the electrical equipment and/or electrical system;
   a data history storage and display unit for storing data received from output of the signal processing and controlling unit; and
   a remote central controlling and data handling unit being connected to the signal processing and controlling unit for effective fault restriction.

2. An electrical fault restricting system as claimed in claim 1 wherein the signal sensed by the sensing device is directly proportional to hot spot and arc develop due to short circuit, open circuit, hot spot and earth faults and the measured signal by the measuring device is directly proportional to earth fault current of fault path at the point of fault.

3. An electrical fault restricting system as claimed in claim 2 where the sensing device and measuring device are placed in the electrical equipment where the electrical fault conditions are sensed and measured.

4. An electrical fault restricting system as claimed in claim 1 wherein the monitoring unit is connected with an individual sensing device or measuring device; thereby, each sensing device and measuring device connects with an individual monitoring unit which separately collects the signals which are amplified and sent to said signal processing and controlling unit.

5. An electrical fault restricting system as claimed in claim 1 wherein the signal processing and controlling unit processes the signals sent by the monitoring unit for determining the amplitude, duration and quantity of electrical fault events.

6. An electrical fault restricting system as claimed in claim 1 wherein the signal processing and controlling unit has selectivity for instant of alarming for fault and for instant of trip signal to interrupt electrical power supply to restrict electrical fault at its initial stage occurrence at the location of interest in particular electrical system and/or electrical equipment.

7. An electrical fault restricting system as claimed in claim 1 wherein the data history storage and display unit is configured to receive data from signal processing and controlling unit and provide sufficient data for assessment of fault signal comparison of fault signal data of relevant electrical system and/or electrical equipment to conclude information for development of fault condition as signals received from the location of interest, for taking decision about planning for preventive maintenance at the location of interest from where signals are received due to electrical fault condition, conclusion about urgency for a task of electrical fault restriction.

8. An electrical fault restricting system as claimed in claim, 1 wherein the remote central controlling and data handling unit includes central data history storage and display unit, the central data history storage and display unit is adapted to record required data of at least two individual signal processing and controlling units, provide for two electrical equipments, so individual signal processing and controlling unit provides necessary alarm and display of data at remote central controlling and data handling unit with reference identity of such signal processing and controlling unit of particular electrical equipment to provide integration at common central location and supervision and centralized controlling station operated for remote individual electrical equipments situated in such industrial premises.

9. An electrical fault restricting system as claimed in claim 1, wherein the image receiver, processor and controlling unit is configured to collect the images of occurrence of electrical fault at the location of interest with the help of image collector arranged with the sensing device and processes the collected image and creates data of particular electrical fault condition where processed images provide sufficient information which is useful for identification of electrical fault condition and further necessary conclusion and action related to restriction of electrical fault in initial stage at location of interest in electrical equipment and/or electrical system.

* * * * *